Feb. 24, 1970  P. W. VANDERHELST  3,497,664
CURRENT AND VOLTAGE REGULATING CIRCUIT FOR INTERMITTENT WELDER
Filed Jan. 11, 1967  4 Sheets-Sheet 1

Fig. 1

INVENTOR.
PETER W. VANDERHELST
BY
Woodhams, Blanchard & Flynn
ATTORNEYS

Fig. 2

INVENTOR.
PETER W. VANDERHELST

Fig. 3
Fig. 4

INVENTOR.
PETER W. VANDERHELST
BY
Woodhams, Blanchard & Flynn
ATTORNEYS

Fig. 5

United States Patent Office 3,497,664
Patented Feb. 24, 1970

3,497,664
CURRENT AND VOLTAGE REGULATING CIRCUIT
FOR INTERMITTENT WELDER
Peter W. Vanderhelst, Livonia, Mich., assignor to
Robotron Corporation, Detroit, Mich., a corporation of Michigan
Filed Jan. 11, 1967, Ser. No. 608,557
Int. Cl. B23k 11/24
U.S. Cl. 219—110                              20 Claims

ABSTRACT OF THE DISCLOSURE

This invention relates to a method of resistance welding particularly adapted for use with a welding machine generating a series spaced, relatively short heat pulses to be applied to a workpiece for welding same. The method contemplates sensing the heat fed to the weld during the heat pulses and comparing this to the desired value of weld heat. In this comparison, an error signal is derived and the weld heat is adjusted in a direction to reduce such error signal. The value of the adjusted weld heat is remembered during the interval between heat pulses and successive heat pulses are begun at the adjusted weld heat of the previous pulse so that initial adjustment of weld heat need not be repeated at the beginning of each succeeding heat pulse.

This invention further relates to the apparatus for carrying out this method. The apparatus provides means for sensing an electrical characteristic related to the weld heat and means for generating a reference signal related to the desired weld heat. Comparison means are provided for comparing the electrical characteristic and the reference signal to obtain an error signal. A memory device is provided which is fed with said error signal. Gating means isolate the memory from the comparison means in the intervals between heat pulses so that the memory retains the value of the error signal, occurring at the end of each heat pulse, until the next heat pulse. Phase shift circuitry responsive to the error signal in the memory are provided for adjusting the weld heat in a manner to tend to reduce said error.

BACKGROUND OF THE INVENTION

This invention relates to a feedback weld heat regulating method and apparatus and more particularly relates to a regulating method and circuit particularly adapted to use in seam or pulsation resistance welding machines for obtaining and then maintaining proper weld heat from heat pulse to heat pulse.

Circuits are known in which the weld current or the voltage drop across the weld head is sensed and compared to a reference signal for determining deviations of the weld heat from a desired level and for correcting such deviations. However, insofar as we are aware, these known circuits are intended for use in continuous welding applications in which a long and continuous train of current pulses pass through the workpiece to effect a weld. Several cycles of the alternating current supply to the welder are normally required to initially correct the weld heat as it is turned on. However, this initial adjustment is substantially shorter than the total cycles per weld. More importantly, the error in the weld is negligible compared to the total heat supplied to the weld. Once the weld is completed, such circuits "forget" the correction applied and must therefore recorrect the weld heat at the beginning of each separate period of weld heat.

However, applications are known and are multiplying in which a series of welds are made rapidly in succession, each being completed in only a few cycles of the alternating current supply, as in seam welding. Further applications exist for pulsation welding in which weld current is fed to a workpiece in a series of spaced bursts or heat pulses, each burst or heat pulse extending over only a few cycles of the alternating electrical supply. In either technique, the number of cycles spanned by a heat pulse may be small enough to closely approach the normal two or three cycle response of known weld current regulator circuits. Thus, if such a known circuit were used for welding in such short heat pulses, the weld current could normally be incorrect for the majority of each heat pulse while the circuit was carrying out the necessary correction. The resultant welds therefore would likely be unsatisfactory.

As a result, it is an object of this invention to provide a feedback weld heat regulating method and circuit, particularly for use where welding current flows in spaced, short bursts of a few cycles each, in which the correct weld current is "remembered" from heat pulse to heat pulse.

A further object is to provide a method and circuit, as aforesaid, in which a correction of the weld heat is made on the initial one or over the initial several heat pulses and no further correction is required on succeeding heat pulses unless some process variable causes a change in weld heat.

A further object is to provide a method and circuit, as aforesaid, in which correction is made for undesired changes in the weld heat automatically as they occur.

A further object is to provide a circuit, as aforesaid, capable of precisely holding the corrected weld heat over time intervals far in excess of the normal "cool" period between successive heat pulses.

A further object is to provide a circuit, as aforesaid, which is also capable, without penalty or adjustment, of operating with a welding machine capable of continuous welding or with machines arranged for alternative use in short burst and continuous welding.

A further object is to provide a circuit, as aforesaid, capable of stable performance over a long service life so as to provide a highly consistent and therefore predictable correction of weld heat in response to identical conditions at the welding zone and which, as at least a part of this stability, is little affected by temperature, voltage and other changes in its operating environment.

A further object is to provide a circuit, as aforesaid, which is relatively long-lived, which can be constructed with readily available components at relatively low cost, which is capable of long periods of correct operation without adjustment or other maintenance and which can be operated, without assistance, by existing welder operators with minimal additional instruction.

A further object is to provide a circuit, as aforesaid, which is capable of producing a series of satisfactory seam and pulsation welds comparable with close precision to the ideal desired and to each other and wherein the individual heat pulse length may correspond generally to, exceed or be exceeded by the number of weld current cycles required to initially adjust the weld heat to the desired level.

Other objects and purposes of this invention will be apparent to persons acquainted with apparatus of this general type upon reading the following description and inspecting the accompanying drawings.

Certain terminology will be used in the following description for convenience in reference only. The words "upwardly," "downwardly," "rightwardly" and "leftwardly" will relate to directions in the drawings to which reference is made. Such terminology will include the words specifically mentioned above, derivatives thereof and words of similar import.

GENERAL DESCRIPTION

In general, the objects and purposes of this invention are met by providing a method of resistance welding particularly adapted for use with a welding machine generating a series spaced, relatively short heat pulses to be applied to a workpiece for welding same. The method contemplates sensing the heat fed to the weld during the heat pulses and comparing this to the desired value of weld heat. In this comparison, an error signal is derived and the weld heat is adjusted in a direction to reduce such error signal. The value of the adjusted weld heat is remembered during the interval between heat pulses and successive heat pulses are begun at the adjusted weld heat of the previous pulse so that the initial adjustment of weld heat need not be repeated at the beginning of each succeeding heat pulse.

The present invention further contemplates a particularly desirable apparatus for carrying out this method. The apparatus provides means for sensing an electrical characteristic related to the weld heat and means for generating a reference signal related to the desired weld heat. Comparison means are provided for comparing the electrical characteristic and the reference signal to obtain an error signal. A memory device is provided which is fed with said error signal. Gating means isolate the memory from the comparison means in the intervals between heat pulses whereby the memory retains the value of the error signal, occurring at the end of each heat pulse, until the next heat pulse. Phase shift circuitry responsive to the error signal in the memory are provided for adjusting the weld heat in a manner to tend to reduce said error.

DETAILED DESCRIPTION

Turning now to the apparatus 10 (FIGURE 1) broadly embodying the invention, same includes a suitable sensing device 11 adapted to measure an electrical condition related to the weld heat applied to a workpiece W disposed between welding electrode E fed from a conventional welding transformer T. The welding transformer T is driven from a conventional weld control C which includes means, not shown, for determining the function intervals of the welding machine associated with transformer T and control C. For convenience in reference, it will be understood that the welding machine has a "weld" interval during which weld current flows and other intervals during which no weld current flows are which will be referred to below merely as a "rest" interval. In addition, since the regulator circuit 10 embodying the invention is particularly adapted, though not limited, to use in pulsed heat welding, the weld interval will be considered to consist of a plurality of heat pulses spaced by "cool" periods in which no weld current flows, each heat pulse constituting a desired number of cycles of weld current.

Figure 1:
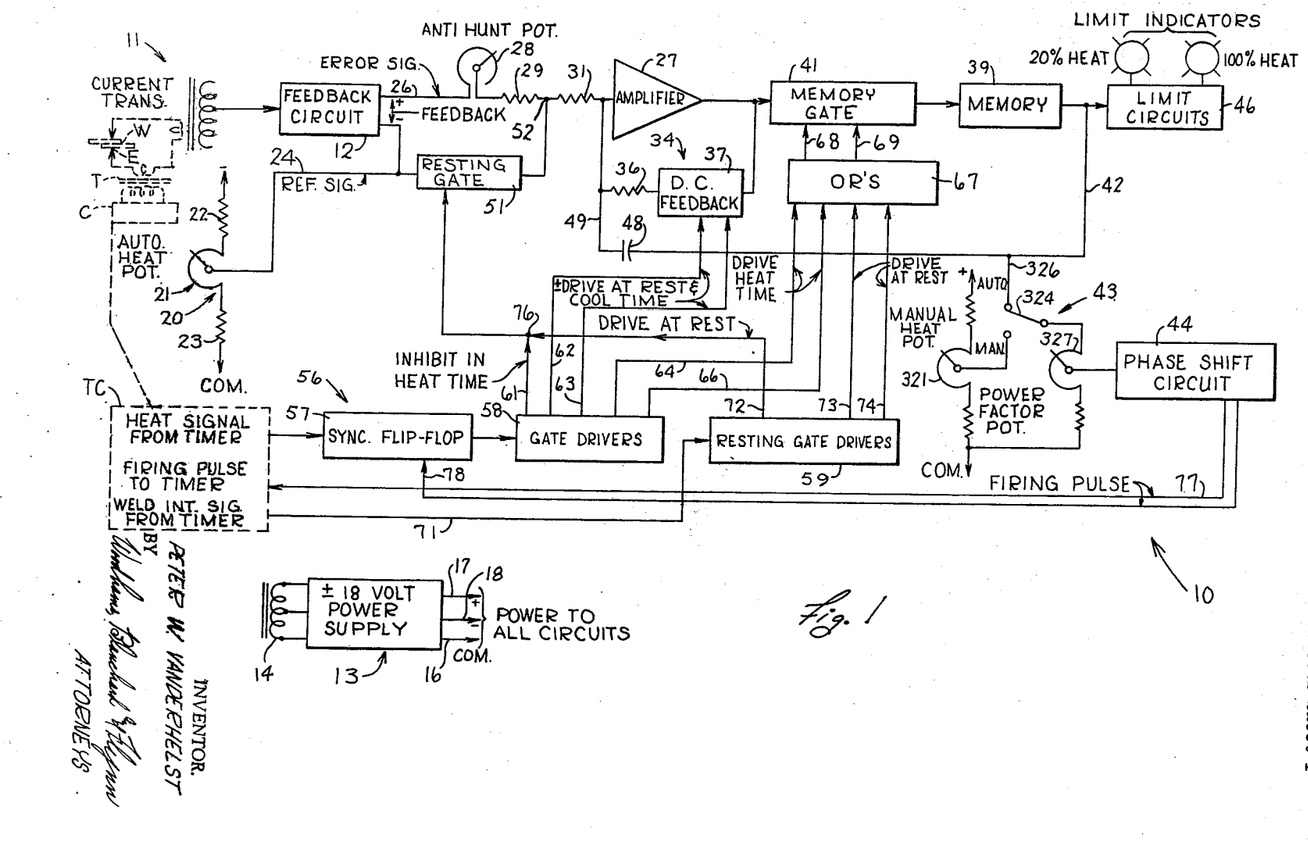
FIGURE 1 is a block diagram of the apparatus embodying the invention.

In the particular embodiment shown, the sensing device 11 is a current transformer, the primary winding of which is connected in circuit with the welding electrodes and welding transformer, the electrical characteristic detected being the welding current. However, it is also contemplated that the transformer 11 might be a voltage transformer having a primary winding connected directly across the welding position to detect the voltage drop thereacross. It is still further contemplated that the sensing device 11 may be any convenient means for determining electrical characteristics other than voltage and current related to the weld heat, such as the resistance across the welding position. The output of the current transformer 11 is applied to a feedback circuit generally indicated at 12.

The power supply 13 is energized through a transformer 14 from an A.C. source, not shown, feeding the associated welding machine. The power supply 13 supplies operating potential on lines 17 and 18 which are positive and negative, respectively, referred to a common line 16.

Means generally indicated at 20 are provided for generating a reference signal which corresponds to the desired level of weld heat. In the particular embodiment shown, the reference signal generating means 20 comprises a potentiometer 21 connected in a voltage divider, having resistances 22 and 23, between the common line 16 and the negative potential line 18. The reference signal appears on the slider of the potentiometer 21 and in the particular embodiment shown, is negative. The reference signal is applied through a line 24 to the feedback circuit 12.

The reference signal and heat signal from the sensing device 11 combine at the output of the feedback circuit to provide an error signal on a line 26 equal to the difference in magnitude between the reference and heat signals. The line 26 connects to the input of a high gain D.C. operational amplifier 27 through an antihunt potentiometer 28 and series resistances 29 and 31. The amplifier 27 amplifies and inverts the polarity of the error signal. The amplifier is provided with a negative D.C. feedback loop 34 which includes a feedback resistor 36 in series with a D.C. feedback gate 37. The D.C. feedback gate 37 is conductive during cycles when no weld current flows, i.e., during cool periods and during the rest interval, to establish a resistive feedback path around the amplifier circuit for limiting its gain.

The output of the amplifier 27 connects to a memory circuit 39 through a memory gate circuit 41. The memory circuit 39 holds or remembers the amplified error signal fed to it by the amplifier 27. The memory gate circuit 41 is arranged to connect the amplifier and memory circuit during cycles when weld current flows, i.e., during heat pulses, so that the signal stored by the memory circuit will equal the instantaneous amplified error signal. The memory gate also conducts during the rest interval. On the other hand, the memory gate circuit falls nonconductive and thereby prevents the output of the amplifier from changing the value stored in the memory circuit during cool periods since the amplifier output will be essentially equal to the reference signal between heat pulses for lack of a heat signal.

The output of the memory circuit 39 is applied through a line 42 and suitable control circuitry generally indicated at 43 to a phase shift circuit 44 which is adapted in a conventional manner to control the energy amplitude of the heat pulses applied to the workpiece W by adjusting the point in phase in each half cycle of the alternating current power supply feeding the welding machine at which weld current begins to flow to the workpiece.

The output of the memory circuit also feeds limit circuits 46. The limit circuits indicate when the memory output signal goes above or below a preselected range corresponding to the usable range of weld heats. In the particular embodiment shown, suitable visible limit indicators hereinafter discussed are driven by the limit circuits 46.

A negative, A.C. feedback path 49 including a capacitor 48, is connected between the output of the memory circuit and the input to the amplifier 27 and acts in conjunction with the antihunt potentiometer to limit the speed of response of the amplifier 27 to changes in the weld heat so as to avoid hunting.

A resting gate circuit 51 connects to the reference signal line 24 and to a point 52 between the resistances 29 and 31. The resting gate connects the reference signal line 24 to the input of the amplifier 27 during the rest interval to conduct the reference signal to the amplifier without passing through the antihunt potentiometer.

As will be seen later, the significant portion of the output signal of the amplifier 27 occurs at the instant of firing of the welding contactor, that, is the instant that welding current is turned on, since the phase shift circuit 44 responds to instantaneous voltages. Since the memory circuit 39 must record this significant amplifier output portion in order to pass it on to the phase shift circuit it is necessary that the various gating circuits 51 and 37 and 41 be switched at the proper instant.

Gate actuating circuitry generally indicated at 56 is disposed between the timer circuit TC of the welding machine, which may be of any conventional type, and phase shift circuit 44 on one hand, and the gate circuits 37, 41 and 51 above described, on the other hand, for actuating the latter in response to signals indicating the occurrence of the weld interval and each heat pulse and the phase shift of weld current initiation. The actuating circuitry 56 more particularly comprises a synchronous flip-flop circuit 57, gate driver circuitry 58 and resting gate driver circuitry 59.

The synchronous flip-flop circuit 57 receives a signal from the welding timer at the beginning of the first half cycle of each heat pulse and also receives, as hereinafter discussed, a firing pulse from the phase shift circuit 44 occurring at the phase point at which weld current is to flow in each half cycle. The synchronous flip-flop circuit 57 responds to these signals by changing state at the point in the first half cycle of the heat pulse at which weld current begins to flow. This is held until the same point in phase in the first half cycle of the following cool period.

The state of the synchronous flip-flop circuit 57 controls the gate drivers 58 so that they will supply gating current to the gates 37 and 41 at the proper time. The gate driver circuitry 58 has one output line 61 which connects to the resting gate 51 for purposes appearing hereinafter. Output lines 62 and 63 connect the gate driver circuitry to D.C. feedback gate 37. Further gate driver output lines 64 and 66 connect through OR circuitry 67 to the memory gate 41.

The resting gate drivers 59 connect through a line 71 to the weld timer TC which supplies an energizing signal to the resting gate drivers 59 during the weld interval only. The resting gate drivers 59 have output lines 72, 73 and 74. The output line 72 connects at a junction point 76 to the gate driver line 61 and thence connects to the resting gate 51. The resting gate output lines 73 and 74 connect through the OR circuitry 67 to the memory gate 41.

The phase shift circuit 44 supplies a firing pulse to the weld timer in the conventional manner on a line 77. A line 78 connects the phase shift circuit 44 to the synchronous flip-flop circuit 57 so that the firing pulse is applied to the synchronous flip-flop circuit 57.

Figure 2:
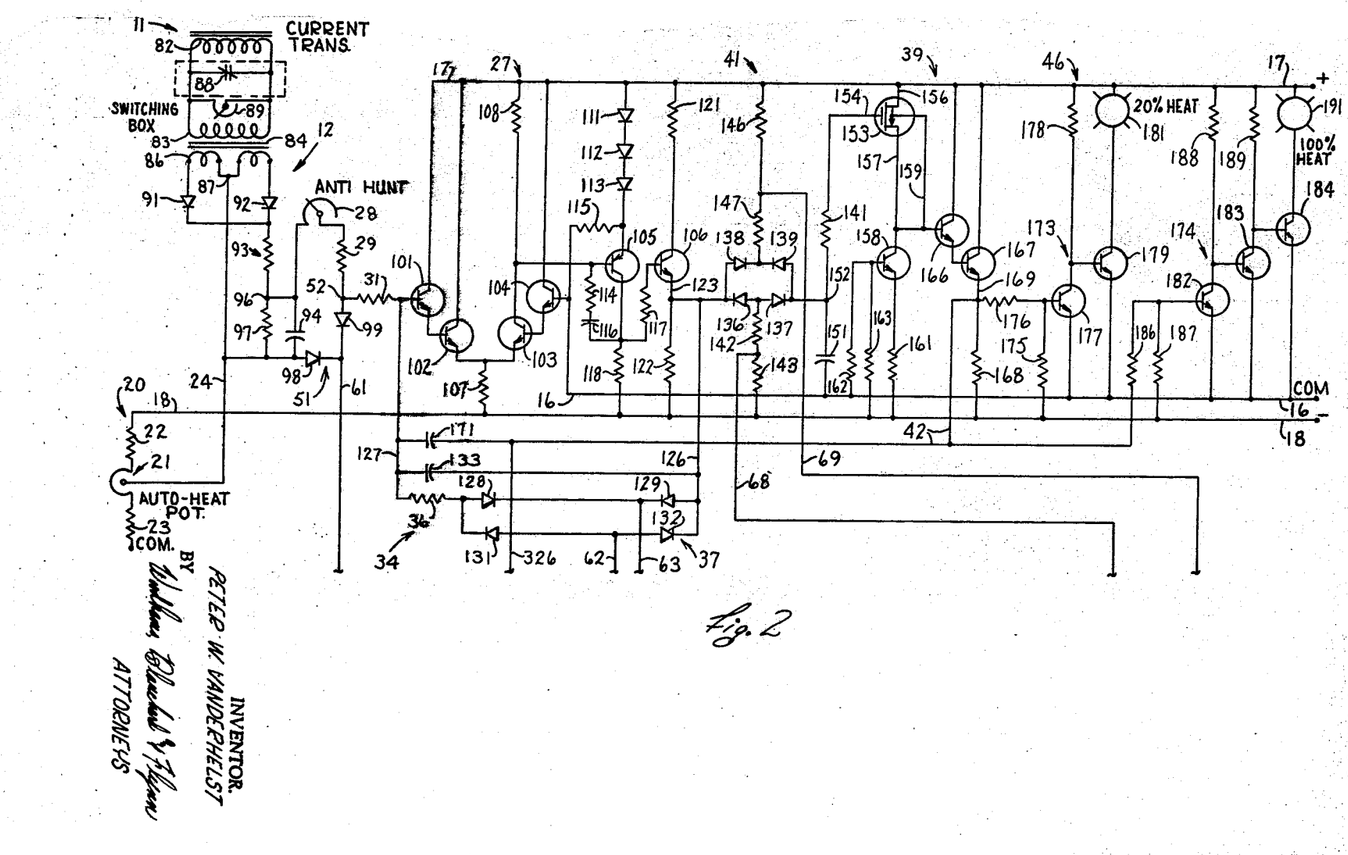
FIGURE 2 is a circuit diagram of apparatus shown essentially in the upper half of the block diagram of FIGURE 1, including the error signal formulating means and the memory circuitry.

APPARATUS OF FIGURE 2

Turning now to the detailed circuitry of the apparatus 10 and more particularly to the internal circuitry of the various blocks of the diagram of FIGURE 1, attention is first directed to FIGURE 2. The sensing device 11, here a transformer includes a secondary winding 82.

The feedback circuit 12 includes a transformer 84. The secondary 82 of transformer 11 connects across the primary 83 of transformer 84 having a secondary winding 86 center tapped at 87. In the particular embodiment shown, switch contacts 88 and a potentiometer 89 are connected across the secondary of the transformer 11. The feedback circuit 12 further includes a full wave rectifier comprising diodes 91 and 92, the anodes of which connect to the ends of secondary 86 and the cathodes of which connect to one end of a voltage divider 93 extending from reference signal line 24. The centered tap 87 also connects to reference signal line 24. A capacitor 94 connects between an intermediate point 96 on the voltage divider 93 and the line 24. The output of the feedback circuit 12 is taken across the capacitor 94.

Thus, the diodes 91 and 92 of the feedback circuit 12 full wave rectify the signal appearing on the secondary 82 of sensing device 11. As a result, a positive D.C. voltage is provided at the upper end of the voltage divider 93 corresponding to the amplitude of the input signal fed to the sensing device 11 and hence to the weld heat. Thus, the difference between the magnitude of the reference signal on the line 24 and the positive, rectified weld heat signal appears at the junction point 96 for application through potentiometer 28 and resistances 29 and 31 to the amplifier input.

The resting gate 51 comprises a pair of diodes 98 and 99, the cathodes of which are connected to the line 61, which in turn leads, as seen in FIGURE 1, to an output of the gate drivers 58 and through the junction point 76 and the line 72 to the output of the resting gate drivers 59. The anodes of the diodes 98 and 99 are connected, respectively, to the line 24 and to point 52 between resistances 29 and 31 above described.

Energization of the resting gate 51 directly connects the reference signal line 24 to the input resistor 31 of the amplifier 27 bypassing resistance 97, capacitor 94, antihunt potentiometer 28 and resistance 39. This automatically determines a fixed amplifier input voltage held until immediately before the start of each weld interval and which is independent of the signal from transformer 11, if any, during this period. Also, the resting gate is rendered nonconductive precisely at the beginning of weld time assuring coupling of the error signal to the amplifier in time for the weld interval.

The operational amplifier 27 is, as stated, a high gain, D.C. amplifier comprising transistors 101 throughout 106.

Transistors 101 and 102 comprise a Darlington circuit. The collectors of said transistors are connected to the positive potential line 17. The emitters of transistors 102 and 103 connect through a common resistor 107 to the negative potential line 18. The base of transistor 103 directly connects to the emitter of transistor 104. The collectors of transistors 103 and 104 are connected to the positive potential line 17, the former through a resistor 108. The collector of transistor 103 also connects to the base of transistor 105. The emitter of transistor 105 connects to the positive potential line through a series of diodes 109, 112 and 113 arranged to allow conventional current flow from the positive potential line 17 through the transistor 105. The transistor 105, a PNP type, is opposite in polarity to the transistors 101 through 104 and 106. The collector of the transistor 105 connects back to the base thereof through a series resistor 114 and capacitor 116 and connects through a resistor 117 to the base of transistor 106. Said collector is also connected to the negative potential line 18 through a dropping resistor 118. The emitter of transistor 105 connects through a resistance 115 to the base of transistor 104 which is connected to the common line 16. The collector and emitter of transistor 106 connect to the positive potential line 17 and negative potential line 18, respectively, through respective resistors 121 and 122. The output of the amplifier appears on the emitter line 123 of transistor 106.

In operation, a small input signal applied to the base of transistor 101 is reproduced at the emitters of series emitter follower transistors 102 and 103. The series emitter follower configuration provides a high input impedance for the operational amplifier 27. The small input signal thus appearing on the emitter of transistor 103 is amplified without polarity inversion and appears as a change in potential on the collector of transistor 103. Transistor 104 is connected as an emitter follower with its base held at common potential by the common line 16. The transistor 104 thus minimizes the deviation of the active signal at the base of transistor 101 from common potential. Transistor 105 amplifies and inverts the phase of the signal appearing on the collector of transistor 104 and the resulting amplified error signal is taken from its collector, is buffered out by the emitter follower transistor 106 and appears on the emitter line 123 thereof as the output of amplifier 27.

The gain of the amplifier 27 is high so that the amplifier is normally operated with negative feedback to limit gain and to enhance stability. In the particular embodiment shown, negative D.C. feedback is applied by the feedback loop 34 as described hereinafter.

The D.C. feedback gate 37 in the feedback loop 34 is connected to the output 123 of the amplifier 27 by a line 126 and, through the resistor 36 to a line 127 connected to the input of the amplifier 27 at the base of transistor 101. The D.C. feedback gate 37 includes a series pair of diodes 128 and 129 connected cathode to cathode between the resistor 36 and the line 126. The feedback gate 37 further includes a second series pair of diodes 131 and 132 connected anode to anode between the resistance 36 and line 126 in parallel with the diodes 128 and 129. The aforementioned lines 62 and 63 from the gate drivers 58 connect, respectively, between diodes 131, 132 and 128, 129. A capacitor 133 is connected between the lines 126 and 127 in parallel with the resistive and nonlinear portions of the feedback loop 34 to apply negative rate of change feedback.

The feedback gate 37 applies negative feedback to the amplifier 27 during the rest interval and during the cool periods between heat pulses in the weld interval. Thus, the D.C. feedback loop 34 is nonconductive only during the heat pulses. The gate circuit 37 controls conduction through the feedback loop and is in turn controlled by the potentials appearing on the lines 62 and 63. A positive potential must appear on the line 62 and a negative potential must appear on the line 63 to render the D.C. feedback gate 37 conductive. More particularly, given a positive going signal at the output of the amplifier, a positive potential on the line 62 will result in current flow from line 62 through diodes 131 and 132. Line 62 will be clamped at the level of the positive amplifier output signal by diode 132 and the low output impedance of the amplifier 27. Thus, the signal from the amplifier output is applied through diode 131 to the input of the amplifier. On the other hand, if the output of the amplifier is negative with respect to the input thereof, a negative potential applied to the line 63 causes the cathode of diode 129 to be clamped substantially at the output signal level as a result of the low output impedance of the amplifier 27. The output signal thus appearing on the cathode of diode 129 is passed by diode 128 to the input of the amplifier.

Because of the high gain of the amplifier 27, a large input signal, as when there is no heat pulse and the only input signal is the reference signal from the auto heat potentiometer, drives the operational amplifier to extreme limits. This is undesirable since it takes a finite time to reduce the amplifier output when the input signal suddenly drops as when another heat pulse begins. Such lag is due, for example, to capacity in and adjacent the operational amplifier circuit. Thus, reducing the gain of the operational amplifier 27 by completing the D.C. feedback loop 34 when there is no heat pulse assures instantaneous response of the amplifier to the error signal when the heat pulse begins.

The memory gate circuit 41 is similar to the aforementioned D.C. feedback gate circuit 37. The memory gate circuit comprises a pair of anode to anode connected diodes 136 and 137. The diode pair 136, 137 parallels a cathode to cathode connected diode pair 138, 139. The diode pairs 136, 137 and 138, 139 are each connected between the output 123 of the amplifier 127 and an input resistor 141 defining the input to the memory circuit 39. Series resistors 142 and 143 define a voltage divider connected between the anodes of diodes 136 and 137 and the negative potential line 18. Similarly, further series resistors 146 and 147 define a voltage divider connected between the cathodes of the diodes 138, 139 and the positive potential line 17. Lines 68 and 69 from the OR circuits 67 connect respectively between resistors 142 and 143 and between resistors 146 and 147.

The operation of the memory gate 41 is substantially similar to that of the D.C. feedback gate 37. More particularly, the memory gate conducts when a positive potential appears on line 68 and a negative potential appears on line 69. Assuming the potential at the output of the amplifier to be more positive than the potential on the output of the memory gate circuit, the relatively low output impedance of the amplifier allows conduction from line 68 through the diode 136 and resistance 122 thus clamping the anode of diode 137 at the level of the amplifier output point 123 and thereby supplying the amplifier output to the memory 39. On the other hand, if the output of the amplifier is negative with respect to the input level of memory 39, the negative potential appearing on line 69 causes conduction through diode 138 to the common line 16 due to the low output impedance of the amplifier 27 and thus clamps the cathode of diode 139 at the signal level appearing at the output 123 of the amplifier. Thus, the amplifier output is impressed through the diode 139 on the input to the memory circuit 39.

The memory circuit 39 includes a memory capacitor 151 which connects from the common line 16 to a junction point 152 between the memory gate and the input resistor 141 of the memory circuit 39. The amplified and inverted error signal is stored on, or remembered by, the capacitor 151. When the memory gate 41 is conducting, the capacitor 151 is connected to the amplifier output so that the voltage across the capacitor 151 follows the output voltage of the amplifier 27. When the memory gate 41 is not conducting, the voltage stored on the capacitor 151 remains at the output signal level of the amplifier occurring immediately prior to turning off the gate.

The remainder of the memory circuit 39 consists of a high impedance buffer arranged to read out the stored signal. The buffer includes a field effect transistor 153. The voltage on the capacitor 151 is applied through resistor 141 to the gate of the field effect transistor 153. An extremely high input impedance is characteristic of field effect transistors. The field effect transistor 153 has an input impedance of the order of 1,000,000,000 megohms ($10^9$ megohms). Thus, the gate 154 of the transistor 153 will draw negligible current from the storage capacitor 151 and thus can read out the voltage on said capacitor for long periods of time substantially exceeding the cool time between heat pulses without noticeably affecting the charge level of the capacitor 151.

The drain 156 and source 157 of the field effect transistor 153 are connected respectively to the positive potential line 17 and to the collector of a transistor 158. The substrate 159 of the field effect transistor 153 is also connected to the collector of transistor 158. The field effect transistor 153 is thus connected as a source follower which arrangement is similar in general operation to the usual transistor emitter follower. This circuit reproduces its input signal at its output (the source terminal of the field effect transistor). The load for the field effect transistor instead of being a resistor as is normally used with an emitter follower, is a current regulating transistor, the transistor 158. The current regulating transistor 158 holds the source and drain current of the field effect transistor 153 at a constant level, here approximately 4.5 milliamperes. Field effect transistors behave more like pentode vacuum tubes than they do conventional transistors and the current biasing, while not absolutely necessary, is a refinement which enhances the gain and linearity of the field effect transistor as a source follower.

The emitter of the current regulating transistor 158 connects to the negative potential line 18 through a resistance 161. The base of the current regulating transistor 158 is held intermediate the common and negative potentials appearing on the common line 16 and the negative potential line 18, respectively, by connection to the intermediate point of a voltage divider connected therebetween and comprising respective resistors 162 and 163.

The buffer circuitry of the memory circuit 39 further includes a pair of transistors 166 and 167 connected as series emitter followers. The source 157 and the substrate 159 of the field effect transistor 153 are connected to the base of the transistor 166. The collectors of transistors 166 and 167 connect to positive potential line 17, the emitter of transistor 166 connects to the base of transistor 167 and the emitter of transistor 167 connects through a resistor 168 to the negative potential line 18. Transistors 166 and 167 provide current amplification for the signal appearing on the source 157 of the field effect transistor 153. The output signal is thus taken from the memory circuit 39 at the emitter 169 of the transistor 167.

Connection is made from the memory circuit output point 169 through negative rate feedback path 42, which includes D.C. blocking capacitor 171 to the input of amplifier 27.

The output of the memory circuit 39 as taken from the emitter 169 of transistor 167 is also applied to the limit circuitry 46. The limit circuitry 46 comprises two limit circuits 173 and 174. In the particular embodiment shown, the first limit circuit 173 is intended to indicate that the weld heat has fallen below 20 percent of the maximum available weld heat. The limit circuit 174 is here arranged to indicate when the weld heat has risen above 100 percent of the maximum available weld heat.

More particularly, the circuit 173 includes an input transistor 177, the base of which connects through a resistor 176 to the memory circuit output 169. The collector of transistor 177 is connected through a resistor 178 to the positive potential line 17 and its emitter is connected to the common line 16. Base bias is applied to the transistor 177 through a resistance 175 connected to the negative potential line 18. The 20 percent limit circuit 173 further includes a transistor 179, the base of which connects to the collector of transistor 177. The emitter of transistor 179 connects to the common line 16 and its collector connects through an indicator, here a lamp or the like indicated at 181, to the positive potential line 17.

The 100 percent limit circuit 174 comprises three series connected transistors 182, 183 and 184. The base of the initial input transistor 182 is fed through a resistor 186 from the emitter 169 in the output of the memory circuit 39. Base bias is supplied to the base of the input transistor 182 by a resistor 187 connected to the negative potential line 18. The emitters of transistors 182, 183 and 184 are all connected to the common line 16. The collectors of transistors 182, 183 and 184 connect to the positive potential line 17, respectively, through resistors 188 and 189 and an indicator, here an indicating lamp 191. The collectors of transistors 182 and 183 connect to the bases of the succeeding transistors 183 and 184. When the weld heat signal falls below 20 percent of the desired maximum, the signal out of the amplifier is negative going and is applied by the memory gate and memory to the input of the indicator circuits 173 and 174. This negative going signal is inverted by transistor 177 to appear as a positive going signal on the base of transistor 179, turning that transistor on and causing the lamp 181 to glow indicating 20 percent or less heat.

By the same analysis, an attempt to reach more than 100 percent heat causes a positive going signal at the amplifier output to be applied by the memory circuit to the base of transistor 182. This causes transistor 182 to conduct turning off transistor 183 and turning on transistor 184 causing lamp 191 to glow and indicate more than 100 percent heat.

Figure 3:
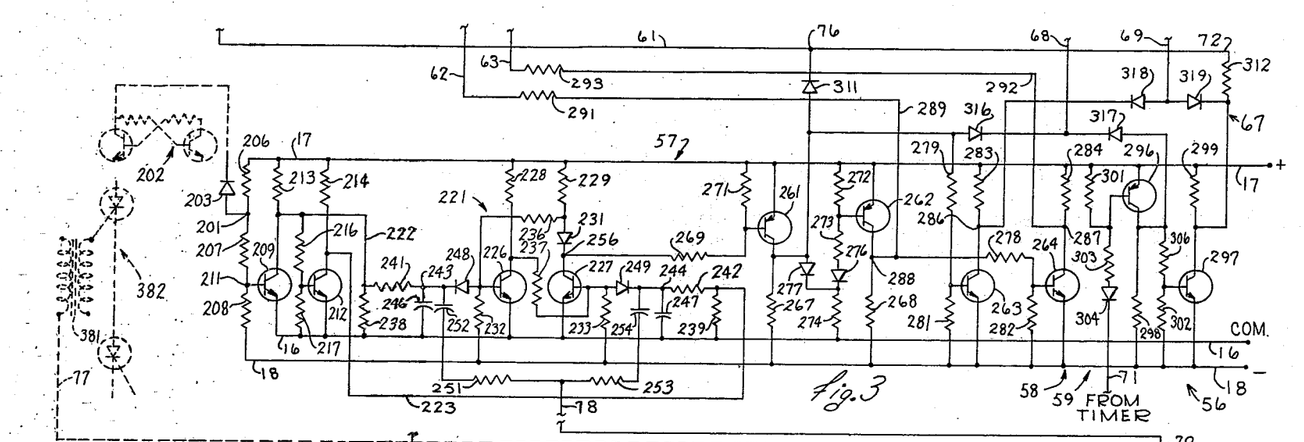
FIGURE 3 is a circuit diagram corresponding generally to the lower leftward segment of the block diagram of FIGURE 1 and including the flip-flop and the driver circuits connecting the circuitry of FIGURE 2 with the weld timer.

APPARATUS OF FIGURE 3

Figure 5:
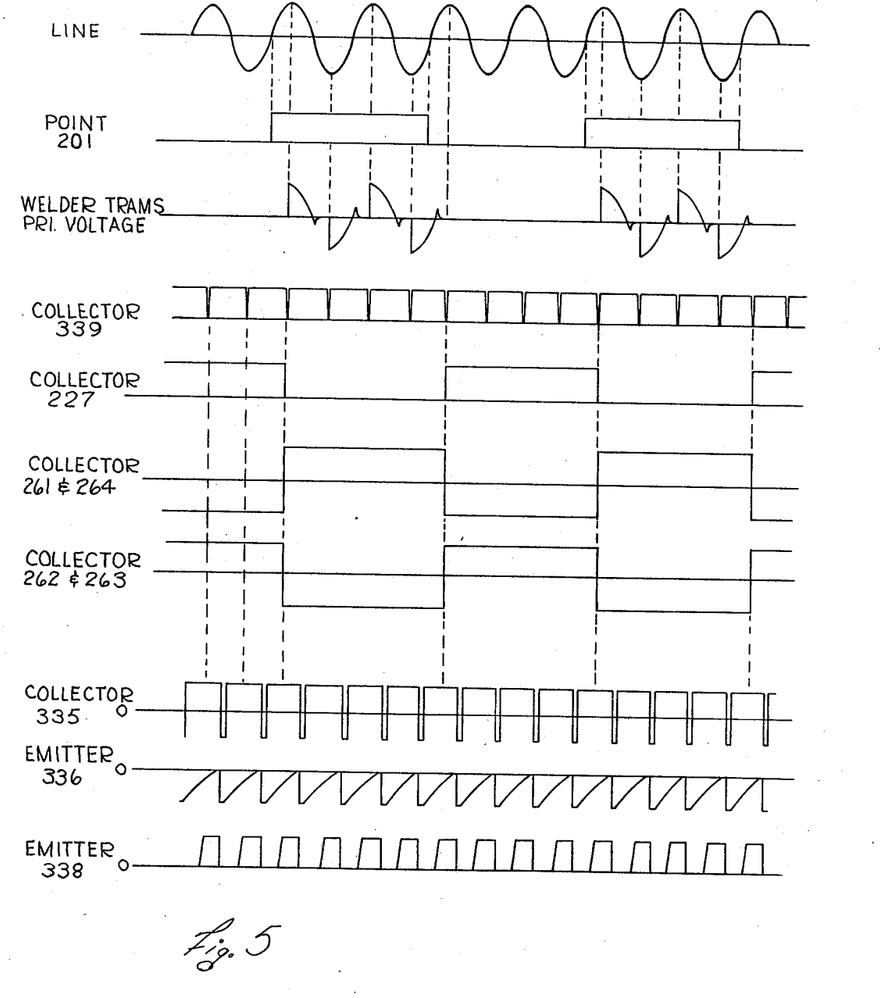
FIGURE 5 is a diagram of electrical wave forms found in the circuit of FIGURE 1.

Turning now to the actuating circuitry 56 (FIGURE 3), the synchronous flip-flop circuit 57 includes an input point 201 to which the welding timer (a portion of which is generally indicated in broken lines at 202) is connected through an isolating diode 203. The timer applies a signal to the point 201 for the duration of each heat pulse, from the beginning of the first half cycle to the end of the last half cycle as illustrated in FIGURE 5. The point 201 lies between resistors 206 and 207 which are connected in series with a further resistor 208 between the positive potential line 17 and the negative potential line 18. The base of a transistor 209 connects to a further junction point 211 between the resistances 207 and 208, the resistance 207 serving to maintain the base of transistor 209 at a lower potential point than is the point 201. The emitters of the transistor 209 and a further transistor 212 connect to the common line 16 while their collectors connect through respective resistors 213 and 214 to the positive potential line 17. The transistors 209 and 212 are connected in series in that the base of the transistor 212 is fed from the collector of transistor 209 through a resistor 216. The base of transistor 212 is biased from the common line 16 through a resistor 217. Thus, conduction of the transistor 209 will drop the base potential of and cut off the transistor 212 while nonconduction of transistor 209 raises the base potential of transistor 212 and allows the conduction thereof. As a result, when the potential of the collector of transistor 209 is high, that of transistor 212 will be low and vice versa. In this way, a change of potential at the point 201 will change the state of conduction of the transistors 209 and 212 and reverse the potentials appearing on the collectors thereof. The collectors of transistors 209 and 212 provide switching voltages to a bistable circuit generally indicated at 221 through lines 222 and 223, respectively.

The bistable circuit 221 includes a pair of transistors 226 and 227. The emitters of transistors 226 and 227 connect to the common line 16 and the collectors thereof connect through respective resistors 228 and 229 to the positive potential line 17. A diode 231 is interposed between the resistor 229 and the transistor 227, its cathode being connected to the collector of said transistor. Base bias is provided to the transistors 226 and 227 from the negative potential lines through resistors 232 and 233, respectively. The bases of transistors 226 and 227 connect through resistors 236 and 237, respectively, to the collectors (in the former case through the diode 231) of the other ones of the transistor pair 226 and 227 for causing said transistors to conduct alternately only.

The collectors of transistors 209 and 212 connect to the common line 16 through resistances 238 and 239, respectively, whereby the collector potential on the transistors is precisely defined when said transistors are nonconductive by the resulting voltage dividers 213, 238 and 214, 239. The resistors 238 and 239 are shorted by conduction of the corresponding transistors 209 and 212. The resulting collector potentials appearing on lines 222 and 223 are applied through respective resistances 241 and 242 to junction points 243 and 244, respectively, connected to the common line by capacitors 246 and 247. The RC networks comprising the elements 241, 246 and 242, 247 damp out transients and control the voltage applied to the junction points 243 and 244. Said junction points are, respectively, connected to the bases of transistors 226 and 227 by diodes 248 and 249, respectively, the diodes being oriented for passing negative going potentials to the bases.

The firing pulse line 78 from the phase shift circuit 44 connects to the outer or cathode end of diode 248 through a resistance 251 and series capacitor 252 and to the cathode of diode 249 through a resistor 253 and series capacitor 254. The collectors of alternatively conductive transistors 209 and 212 alternatively lower the potential of the junction points 243 and 244.

In the rest interval and during the cool periods between heat pulses, the signal at junction point 201 is at a low level so that the transistor 209 is cut off and the transistor 212 is conductive. The resulting high potential on the collector of transistor 209 is applied to the cathode of diode 248 and prevents capacitively coupled pulses from the line 78 from dropping the base potential of transistor 226 sufficiently low as to cut same off. On the other hand, the low collector potential of transistor 212 cannot supply such bias to the diode 249 and, as a result, negative pulses coupled by the capacitor 254 from line 78 are applied to the base of transistor 227 to cut same off. As a result, the output point 256 on the collector of transistor 227 is at a high potential during the cool periods and rest interval.

On the other hand, at the beginning of the first half cycle of each heat pulse, the timer raises the potential at junction point 201 causing conduction of transistor 209 and cutoff of transistor 212. The resulting low potential on the collector of transistor 209 no longer blocks diode 248 and the next negative pulse coupled by capacitor 252 from the phase shift circuit output line 78 causes transistor 226 to immediately cut off. Transistor 227 is not cut off because diode 249 is now biased for nonconduction by the high potential appearing on the collector of nonconductive transistor 212. Thus, transistor 227 will conduct when transistor 226 cuts off and the potential on output point 256 will fall sharply. This drop in output potential occurs precisely at the beginning of weld current conduction in the first half cycle of the heat pulse, since the pulse applied to the synchronous flip-flop circuit by the phase shift circuit occurs at the point in phase that weld current flow is initiated. The potential of transistor 227 is shown in FIGURE 5.

The gate driver circuitry 58 includes transistors 261 through 264. Transistors 261 and 262 are PNP types and thus are opposite in polarity from those used in the synchronous flip-flop circuit 57 and from the transistors 263 and 264. The emitters of transistors 261 and 262 connect directly to the positive potential line 17 and their collectors connect through resistors 267 and 268, respectively, to the negative potential line 18. The potential on the output point 256 of the synchronous flip-flop 57 is applied through a resistor 269 to the base of transistor 261. Base bias is supplied to the transistor 261 through a resistance 271 connected to the positive potential line 17. A voltage divider is connected between the positive potential line 17 and common line 16. The voltage divider comprises series resistance 272, 273 and 274. A diode 276 is connected in series between resistances 273 and 274 and is oriented for passing current from the positive potential line 17 to the common line 16. The base of the transistor 262 connects between resistances 272 and 273 for bias. The collector of transistor 261 connects to the anode of a diode 277 the cathode of which connects to the cathode of diode 276.

The output of the transistor 262 is taken from the collector thereof and applied through a resistance 278 to the base of transistor 264. The collector potential of the transistor 261 is applied through a resistor 279 to the base of transistor 263. Base bias is supplied to transistors 263 and 264 through resistors 281 and 282 connected to the negative potential line 18. The emitters of transistors 263 and 264 are directly connected to the negative potential line 18 while the collectors thereof are connected through resistors 283 and 284, respectively, to the positive potential line 17.

Thus, the negative going potential appearing on the output terminal 256 of the synchronous flip-flop 57 during heat pulses causes the transistor 261 to conduct raising the collector potential thereof and thereby raising the base potential of transistor 263. Thus, the transistor 263 turns on and its collector potential appearing at junction point 286, falls. On the other hand, the high potential appearing on the collector of transistor 261 during heat pulses is passed by diode 277 to the voltage divider 272, 273 and 274 for raising the potential of cathode of diode 276 to the level close to that of positive potential line 17. This in turn raises the base potential of transistor 262 causing same to cut off and as a result causing the collector potential thereof to drop to a low value. This low value of collector potential is impressed by resistance 278 onto the base of transistor 264 causing same to cut off and elevating the collector potential thereof, as seen at junction point 287, during heat pulses. During the cool periods between heat pulses or during the rest interval, the potentials appearing on the collectors of transistors 261 through 264 are reversed. The collector potentials of transistors 261 through 264 are shown in FIGURE 5.

The collector 288 of transistor 262 connects through a line 289 and resistance 291 to the aforementioned line 62 leading to the D.C. feedback gate 37. Similarly, the collector 287 of transistor 264 connects through a line 292 and resistance 293 to the line 63 leading to the D.C. feedback gate 37. In this manner, a negative going potential is impressed on line 62 and a positive going potential impressed on line 63 during heat pulses, such potentials being reversed at other times.

The resting gate driver circuitry generally indicated at 59 includes a pair of transistors 296 and 297. Said transistors are of opposite polarity, the transistor 296 being a PNP type. The emitter of transistor 296 is connected to the positive potential line 17 and the emitter of transistor 297 is connected to negative potential line 18. The collector of transistor 296 connects to the negative potential line through a resistance 298 and the collector of transistor 297 connects to the positive potential line 17 through a resistance 299. Base bias is applied to transistor 296 through a resistance 301 from the positive potential line 17 and to the base of transistor 297 through a resistor 302 from the negative potential line 18.

A negative going signal is applied to the base of transistor 296 through a resistance 303 and a suitably oriented isolating diode 304 by the line 71 from the weld timer during the rest interval. The resulting conduction of transistor 296 raises its collector potential which is supplied through a resistance 306 to the base of transistor 297 to cause conduction thereof. The collector potential of transistor 297 thus drops at rest interval. On the other hand, a positive potential is applied to diode 304 by the weld timer during the weld interval which allows the resistor 301 to apply a positive potential to the base of transistor 296 cutting same off. The resulting low potential on the collector of transistor 296 is applied through resistance 306 to the base of transistor 297 which causes that transistor also to cut off. As a result, collector potential of the transistor 297 rises during the weld interval.

It will be noted that the collector of transistor 261 of the gate driver circuit 58 connects through a diode 311 to the junction point 76 on the line 61 leading to the resting gate 51 seen in FIGURE 1. The anode of diode 311 is toward the transistor 261. On the other hand, the collector of transistor 297 in the resting gate circuit 59 connects through a resistance 312 and the aforementioned line 72 to the same junction point 76 and thence through line 61 to the resting gate 51. During the rest interval the collector of transistor 297 is at a low potential due to the conduction of transistor 297. As a result, conduction occurs through the diodes of the resting gate 51, lines 61 and 72 and the transistor 297. Thus, the transistor 297 provides drive for the resting gate 51 during the rest interval. On the other hand, during the weld interval, the transistor 297 is nonconductive and its collector is at a high potential thus blocking conduction by the diodes of the resting gate 51.

During the heat pulses, the transistor 261 becomes conductive whereby its collector is at a high potential and this high potential is applied through diode 311 to the line 61 to re-enforce the blocking of the diodes of the resting gate by transistor 297. Thus, the resting gate is shut off during the weld interval and this shut-off condition is particularly re-enforced during the heat pulses occurring in that weld interval.

Diodes 316 through 319 comprise the OR circuitry 67. Diodes 316 and 317 connect cathode to cathode in series between the collectors of transistors 261 and 296. The aforementioned line 68 to the memory gate 41 connects between the cathodes of diodes 216 and 217, whereby the transistor 261 which is conductive during each heat pulse applies its high collector potential to the line 68 through diode 316 for energizing diodes 136 and 137 of the memory gate 41. Similarly, diodes 318 and 319 are connected anode to anode in series between the collector of transistor 263 and the collector of transistor 297. The forementioned line 69 to the memory gate 41 connects between the anodes of diodes 318 and 319 whereby the low potential appearing on the collector of transistor 263 during heat pulses provides for conduction through diodes 138 and 139 of said memory gate. In this way, the OR circuitry 67 provides for turning on of the memory gate during the heat pulses. In the rest interval, the collector potential of transistor 296 is high and that of transistor 297 is low thus providing through the OR diodes 317 and 319, respectively, drive for the memory gate 41. Thus, the memory gate is operative during heat pulses and during the rest interval.

Figure 4:
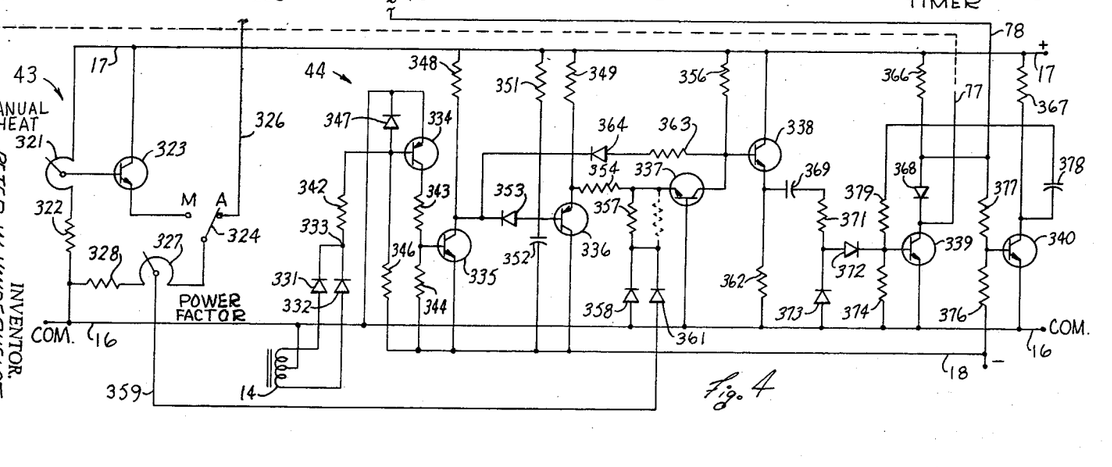
FIGURE 4 is a circuit diagram of a phase shift circuit particularly adapted for use with the circuitry of FIGURES 2 and 3, said phase shift circuit being indicated in FIGURE 1.

APPARATUS OF FIGURE 4

Turning now to the phase shift circuit 44 and to the control circuitry 43 associated therewith, reference is made to FIGURE 4. The control circuitry 43 comprises a manual heat potentiometer 321 manually adjustable for controlling the weld heat. The manual heat potentiometer 321 connects at one side to the positive potential line 17 and at the other side through a resistor 322 to the common line 16. The setting of manual heat potentiometer controls the base bias on a manual heat transistor 323 (not shown in the block diagram of FIGURE 1, for purposes of simplification), the collector of which connects to the positive potential line 17 and the emitter of which connects to the manual contact M of a manual-automatic selector switch 324. The automatic contact A of the switch 324 connects through a line 326 to line 42 and thereby to the external feedback loop 42 (FIGURE 1) for supplying the output of the memory circuit to the phase shift circuit 44. A power factor potentiometer 327 connects to the wiper of the switch 324 and, through a resistor 328, to the common line 16.

The aforementioned A.C. supply transformer winding 14 (FIGURE 4) has its ends connected through rectifiers 331 and 332 to a junction point 333 in a manner to provide a pulsating positive D.C. signal thereto. The phase shift circuit 44 includes transistors 334 through 340 and is intended as a preferred example of a phase shift circuit useable with the above-described portion of the apparatus 10 although the invention is by no means limited to this particular phase shift circuit.

The positive pulsating D.C. at junction point 333 is applied to the base of transistor 334 through a resistance 342. The transistor 334 is connected through its emitter to the common lines 16 and its collector is connected through series resistors 343 and 344 to the negative potential line 18. Base bias is provided to the transistor 334 through a resistor 346 connected to the negative potential line 18. A diode 347 clamps the base of transistor 334 to the common line 16 and prevents its base potential from rising above common potential. It will be noted that transistors 334 through 337 alternate in type transistors 334 and 336 being PNP types. The emitter of transistor 335 connects to the negative potential line 18 and its collector connects through a resistance 348 to the positive potential line 17. Base bias and energizing signal are supplied to the base of the transistor 335 through its connection intermediate resistances 343 and 344. The collector of transistor 336 connects to the negative potential line 18 while its emitter connects through a resistance 349 to the positive potential line 17. The base bias is supplied to the transistor 336 through a resistor 351 from the positive potential line 17. Such base is also capacitively coupled at 352 to the negative potential line 18. A diode 353 is disposed between the base of transistor 336 and the collector of transistor 335 for clamping said base to the negative potential line during conduction of transistor 335.

The full wave rectified signal applied to the base of transistor 334 causes same to conduct for approximately one millisecond at the zero and 180 degree points on the supply voltage wave. Conduction of transistor 334 raises the base potential on base 335 causing same to conduct and thereby discharge capacitor 352. For the remainder of each half cycle, the transistors 334 and 335 are nonconductive and the capacitor 352 is charged through resistor 351. Thus, a saw-toothed waveform appears across the capacitor 352 which is applied to the transistor 336 and, inasmuch as said transistor is connected as an emitter follower, appears on the emitter thereof. The resulting saw-toothed signal is most negative at the start of each half cycle and rises with time. The signals appearing on the collector of transistor 335 and emitter of transistor 336 are illustrated in the bottom portion of FIGURE 5 along with the line voltage appearing across the winding 14.

The resulting saw-tooth voltage is applied through a resistor 354 to the emitter of transistor 337. The base of transistor 337 connects directly to common line 16 and its collector connects to the positive potential line 17 through a resistor 356. The emitter of transistor 337 is connected to the common line through a resistor 357 and a diode 358. The diode 358 prevents the emitter potential of transistor 337 from falling below common potential.

The wiper of the power factor potentiometer 327 connects through a line 359 and diode 361 and thence through resistance 357 to the emitter of transistor 337. The diode 361 is oriented with its anode toward the potentiometer wiper. Thus, both the positive heat signal from the potentiometer 327 and the rising saw-tooth waveform from transistor 336 appear on the emitter of transistor 337. As a result, normally conductive transistor 337 will cut off at the point in each half cycle at which the effect of the heat signal is greater than the effect of the sawtooth. More particularly, a high value of the heat signal will result in early cutoff where a low value of the heat signal will cause a late cutoff of transistor 337. When the transistor 337 cuts off, its collector potential rises sharply.

Transistor 338 is an emitter follower arranged with its collector connected to the positive potential line 17 and emitter connected through a resistor 362 to the common line 16. The base of transistor 338 connects to the collector of transistor 337 whereby the sharply rising voltage appearing on such collector in the intermediate portion of each half cycle is impressed on transistor 338 and appears on its emitter as shown in FIGURE 5. The base of transistor 338 also connects through a resistor 363 and clamping diode 364 to the collector of transistor 335 for reducing the potential on the base of transistor 338 when transistor 335 is conducting, that is, at the zero and 180 degree points of each cycle. This causes the transistor 338 to cease conducting at the beginning of each new half cycle.

Transistors 339 and 340 define a one-shot multivibrator circuit. The emitter of transistors 339 and 340 couple directly to the common line 16 and the collectors thereof are connected to resistors 366 and 367 to the positive potential line 17. In addition, a diode 368 is interposed between the collector of transistor 339 and resistor 366 and is oriented for passing conventional current from positive line 17 through the transistor 339. The emitter of transistor 338 connects through a series capacitor 369, resistor 371 and diode 372 to the base of transistor 339 of the one-shot circuit. The diode 372 is oriented to pass positive going voltages to the base of transistor 339. A clamping diode 373 connects between the anode of diode 372 and the common line 16 for maintaining the anode of the diode 372 at the common potential or above. Base bias is supplied to transistor 339 through a resistor 374 connected to the common line 16. Base bias is supplied the transistor 340 through a resistor 376 coupled to the negative potential line 18. The base of transistor 340 couples to the collector of transistor 339 through a resistor 377 and the aforementioned diode 368. On the other hand, the collector of transistor 340 couples through a capacitor 378 and resistor 379 back to the base of transistor 339 for providing feedback thereto.

In operation, the beginning of conduction of the transistor 338 and the resulting rise in potential on the emitter thereof is coupled as a positive spike pulse by capacitor 369 through resistance 371 and diode 372 to the base of transistor 339 causing same to conduct momentarily. The resulting fall in potential on its collector is carried by line 77 coupled to said collector to a phase inverting coupling transformer 381 in the heat control circuit generally indicated in broken lines at 382 of the weld timer such coupling transformer and contactor circuit being here shown as of conventional construction. Thus, the drop in potential appearing on the collector of the momentarily conductive transistor 339 appears as a positive pulse applied to the heat control 382 for initiating weld current flow in each half cycle of the alternating current supply during a heat pulse.

The drop in potential on the collector of transistor 339 is also applied through diode 368 and resistor 377 to the transistor 340 rendering same momentarily nonconductive and causing a rise in potential on the collector thereof. This rise in potential is coupled as a positive spike pulse by the capacitor 378 to the base of transistor 339 and re-enforces the pulse originally coupled to the base thereof from the collector of transistor 338. As the capacitor 378 charges the second pulse dissipates and the base of the transistor 339 drops in potential to that of the common line 16 as a result of the bias of resistor 374. As a result, the transistor 339 falls nonconductive, the collector potential thereof rises and the inverting transformer 381 removes the positive signal from the heat control 382 which, however, continues to allow conduction of signal until the end of the half cycle. The rise in collector potential on transistor 339 allows the voltage divider 376, 377 to raise the base potential on transistor 340 thereby rendering same conductive. The resulting drop in collector potential is applied as a negative pulse by capacitor 378 to the base of transistor 339 to re-enforce its cutoff. The drop in potential on the collector of transistor 339 also drops the potential of line 78, which is coupled to the anode of the diode 368, and thereby delivers the required negative firing pulse through line 78 to the synchronous flip-flop circuit 57 to cause same to energize the gate drivers to apply the proper gating potential to the D.C. feedback and memory gates at the beginning of welding current flow in each half cycle of each heat pulse.

OPERATION

Briefly, the apparatus 10 is set up by first adjusting the power factor potentiometer 327 to the desired setting with the manual heat potentiometer set for maximum heat using an oscilloscope in a conventional manner. The manual heat potentiometer is then set to produce a good weld. The machine preferably is adjusted so that good welds result with manual heat potentiometer set at 50 to 80 percent heat. Potentiometer 89 in the current feedback circuit 12 is set at maximum resistance to allow maximum current to flow into the feedback circuit from the current transformer 11. The reference potentiometer 21 is now set at the same setting as the manual heat potentiometer. Trial welds are made during which the 20 percent heat indicator lamp 181 normally lights. Current feedback potentiometer 89 is then adjusted until a point is found at which the light goes off. Noting such an adjustment point, the potentiometer 89 is further adjusted until the 100 percent heat indicator light glows and the position is noted. The potentiometer is then reset intermediate the two observed points. The control may now be switched to auto heat by means of the manual-auto switch 324 and current will be regulated and controlled according to the auto heat potentiometer setting. Whenever desired the welder can be operated manually. The following discussion is of the automatic mode of operation, however.

With the apparatus 10 in the rest interval, no heat signal from the welding timer is applied to the synchronous flip-flop circuit 57. Thus, the output point 256 of the synchronous flip-flop circuit 57 will be at a high potential and the gate driver circuits 58 will be in such a state as to provide driving signal to the D.C. feedback gate 37 to establish D.C. feedback around the amplifier through resistor 36.

With the apparatus in the rest interval there is no weld interval signal from the timer on line 71. The resting gate drivers 59 thus provide drive current to the resting gate 51 to short out the antihunt potentiometer 28 and directly connect the reference signal line 24 to the amplifier 27 through resistance 31. The resting gate drivers 59 will also supply drive current through the OR circuits 67 to the memory gate 41 causing that gate to connect the output of the amplifier 27 to the memory circuit 39. Thus, during the rest interval, all of the gates conduct. Under this rest condition, the amplifier output will be opposite in sign and aproximately equal in magnitude to the auto heat reference signal appearing on the line 24, resistors 31 and 36 having been chosen to achieve this relationship of amplifier and input and output. The amplifier output signal is thus gated through the memory circuit 39 as aforesaid and appears via the line 42 on the power factor potentiometer 327. A portion of the signal thus appearing on the power factor potentiometer 327 is applied to the phase shift circuit 44 and determines the phase displacement of the firing pulses appearing at the output 77 and 78 of the phase shift circuit during the rest interval. Thus, the phase displacement has been set "open loop" by the auto heat potentiometer during the rest period.

At the beginning of the weld interval and more particularly at the beginning of the first half cycle of the first heat pulse weld current will begin at this "open loop" phase angle.

Again at the beginning of the weld interval, a weld interval signal from the weld timer is passed by line 71 to the resting gate drivers 59 and causes same to remove drive from the memory gate 41 and from the resting gate 51 thus rendering these gates nonconductive. The memory capacitor 151 (FIGURE 2) "remembers" or retains the charge corresponding to the voltage previously impressed upon it through the memory gate by the amplifier 27. The signal remembered thus was essentially equal to the reference signal from the auto heat potentiometer 21 as above described. In this manner, the welding machine will initiate conduction of weld current in the first of the weld interval at that phase angle selected by the phase shift circuit 44 and which corresponds to the remembered signal on the capacitor 151.

At the same time that the heat control indicated by broken lines at 382 conducts and thereby initiates weld current flow in the first half cycle of the first heat pulse, the synchronous flip-flop circuit 57 is switched by the phase shift circuit 44 in a manner that the potential on its output terminal 256 falls. As a result of such fall, gate drive is removed from the D.C. feedback gate 37 and applied to the memory gate 41. Thus, the memory gate 41 again becomes conductive (having been inoperative during the first portion of the first half cycle of the weld interval). The memory gate 41 is now the only gate functioning.

As welding current begins to flow, a positive current feedback signal appears at the output of the feedback circuit 12 and is added to the negative auto heat reference signal. The resulting difference or error signal is applied to the antihunt potentiometer 28 and represents an error in actual weld current from that selected in setting the auto heat reference potentiometer 21. This error signal drives the amplifier 27 through the antihunt potentiometer 28 and associated resistances in a manner to impress on the memory 39 and thereby on the phase shift circuit 44 a signal to cause phase shifting of the firing of the heat control indicated in broken lines at 382 in a direction to correct the welding current to its desired value and thereby to lessen the error signal applied to the amplifier 27. Thus, it will be apparent that during actual welding current flow, there is a closed feedback loop which includes the current transformer 11, feedback circuit 12, amplifier 27, memory gate 41, memory 39, phase shift circuit 44, heat control 382 and hence the weld circuit including welding transformer T, electrodes E and workpiece W and thereby the primary winding of current transformer 11.

If, for example, welding current was less than the desired level selected on the auto heat potentiometer 21, the current feedback signal conveyed by the feedback circuit 12 from the current transformer 11 would be less than the reference signal appearing on line 24. This would result in a negative error signal which would drive the output of amplifier 27 positive. The positive amplified output would pass through the memory gate 41 and memory circuit 39 and would be applied to the phase shift circuit 44 and more particularly to the emitter of transistor 337 (FIGURE 4) to cause initiation of weld current earlier in the following half cycle. There would in consequence be an increase in weld heat thus tending to correct the insufficiency. Excessive weld current causes a positive going error signal which results in a negative going amplifier output applied by the memory gate and memory to the phase shift circuit causing same to retard the onset of weld current flow and thereby reduce weld heat to afford the desired correction.

To avoid hunting, the speed of response of the regulating circuitry 10 must be limited. To this end, any change in memory output signal is rate coupled back to the amplifier input through capacitor 48 (FIGURE 1). As a result of the phase inversion by the amplifier 27, the polarity of the feedback signal passed by capacitor 48 will oppose the polarity of the input applied to the amplifier. This slows the excursion of the amplifier output signal so that the time required for the regulator to fully correct the weld current will preferably be of the order of at least two or three cycles. It has been found advisable not to operate a feedback regulating device faster than the response time indicated since the resistance welding circuit itself may cause instability to occur if a greater speed of response is attempted. The relative slowing of amplifier response is adjustable by the antihunt potentiometer.

The amplifier output signal is not a steady D.C. signal but rather contains some ripple. Due to the design of the phase shift circuit 44 the significant amplitude of the amplifier output signal is that amplitude occurring that instant of generation of firing pulse (the beginning of weld current flow).

At the end of the heat pulse, the heat control 382 of the weld timer is de-energized. The memory gate 41 will continue to conduct the amplifier signal into the memory 39 until the firing pulse occurs on output line 77 of the phase shift circuit 44 in the first half cycle of the succeeding cool pulse. More particularly, the synchronous flip-flop circuit 57 changes state at this point due to the firing pulse on line 78 and the lack of the heat signal from the timer. The synchronous flip-flop thereby removes drive from the grate drivers 58. The memory gate 41 accordingly ceases conduction so that the memory circuit will "remember" the amplified error signal amplitude as it was following the end of the heat pulse. The memory output signal remains fixed at this same level, because the extremely high input impedance of the field effect transistor 153 makes negligible its drain of the charge on capacitor 151, until the synchronous flip-flop 57 is again actuated by the timer and line 78 for a second heat pulse. Since the memory output signal remains unchanged during the cool time between heat pulses, the phase displacement of initial current flow in each half cycle is the same as the phase displacement used at the end of the previous heat pulses, such displacement being in no way altered during the cool time between the first and second heat pulses.

During the cool time between heat pulses there will be no feedback of weld heat to the amplifier since there is no weld current. However, it is not desirable to operate the amplifier without some feedback since its gain is extremely high. The output signal of the amplifier without negative feedback would travel to the extreme capability of the circuit and hysteresis effects would prevent fast recovery of the circuit to the usual small signal condition when feedback from the weld heat condition appeared once again at the onset of another heat pulse. Thus, to provide essentially instantaneous response of the amplifier to the onset of a new heat pulse, the D.C. feedback gate 37 is driven during cool time to provide a negative D.C. feedback path around the amplifier through resistor 36. This feedback path effectively reduces the gain of the amplifier to keep the output signal thereof within reasonable limits.

No welding machines use more than 100 percent current and due to device limitations, it is not desirable to attempt to pass less than 20 percent current. Should some external variable occur which would make it necessary for the regulator to attempt to use more than 100 percent or less than 20 percent of the current, the limit circuit 46 will actuate to indicate by one of the lamps 181 or 191 that the control is unable to regulate properly due to some external variable.

Considering again the setup procedure for the apparatus 10, the limit circuit, as mentioned above, also may operate when the apparatus is operated in the manual heat mode. Under this condition, the amplifier 27 does not control the phase shift circuit 44 and so there is no closed feedback path through the phase shift circuit and welding head, as in automatic operation, during conduction of weld current and therefore the amplifier gain is extremely high. Therefore, a small error signal appearing at the input of the amplifier will cause a large change in the amplifier output signal. Since the setup procedure consists of initially matching reference and feedback signals at the desired welding current coil, the limit indicators 181 and 191 are useful in indicating the proper setting of calibration adjustment. If the control is operated in manual heat, the limit indicators will light from time to time which means only that the current obtained with the manual setting is not equal to that setup and calibrated for with the automatic heat potentiometer. When the apparatus is operating in its manual mode, the limit indicators thus do not indicate a malfunction due to external variables as in the case of automatic operation.

Although a particular preferred embodiment of the invention has been described above for purposes of illustration, modifications or variations lying within the scope of the appended claims are fully contemplated.

The embodiments of the invention in which an exclusive property or privilege is claimed are defined as follows:

1. A method of resistance welding for use with a machine generating a series of spaced, relatively short heat pulses and applying same to a workpiece to be welded, comprising the steps:
   selecting a desired value of weld heat and establishing a signal correspondence thereto;
   sensing the heat fed to the weld;
   comparing the heat fed to the weld during such heat pulses to said desired value of weld heat, deriving an error from such comparison and adjusting said signal to adjust the weld heat to reduce said error;
   remembering the value of the adjusted signal during the interval between heat pulses and beginning the heat pulse following said interval at said adjusted weld by utilizing such remembered signal value to control the heat value of said following heat pulse;
   whereby readjustment of weld heat need not be carried out at the beginning of each heat pulse.

2. The method defined in claim 1 including the step of correcting the weld heat to its desired value, after said first-mentioned adjustment, in response to changes in weld heat resulting from changes in the welding variables.

3. A method for regulating welding current from an alternating supply applied as discrete multicycle heat pulses to a workpiece, comprising the steps:
   comparing a signal related to the instantaneous weld current to a reference signal and deriving an error signal from said comarison;
   applying said error signal to a high gain D.C. operational amplifier;
   storing the instantaneous output of said amplifier in a memory device;
   sensing the stored signal and adjusting the point in phase of each half cycle of the alternating supply at which weld current begins to flow and carrying out said adjustment in the direction required to minimize said error;
   isolating said memory device from said amplifier at the end of each heat pulse and maintaining the last value of the stored signal unchanged during the cool period between the heat pulses;
   supplying negative D.C. feedback around said amplifier during said cool period to limit the gain thereof;
   reconnecting said amplifier and memory device and disconnecting said feedback path upon first conduction of weld current in a subsequent heat pulse;
   whereby the weld heat is held at the same level between adjacent heat pulses and the amplifier is instantaneously ready for readjusting the stored signal if required at the beginning of said subsequent heat pulse.

4. The method of claim 3 in which negative rate feedback is applied from the output of the memory device to the input of said amplifier continuously and in cooperation with an input resistance of said amplifier for limiting the speed of response of said amplifier to variations in the error signal applied to it so as to minimize hunting.

5. The method of claim 3 including the step of maintaining connection between said amplifier and memory device and said D.C. feedback around said amplifier in the rest interval of the welding sequence so as to relate the point in phase at which weld current is to begin to the magnitude of said reference signal.

6. The method defined in claim 5 including the step of reducing the resistance through which said reference signal is applied to said amplifier during said rest interval and raising same during said welding interval.

7. In an apparatus for regulating welding heat applied to a workpiece in discrete pulses by a welding machine, the combination comprising:
   means for sensing an electrical characteristic related to the weld heat;
   means responsive to the deviation of said sensed electrical characteristic from a desired characteristic for producing an error signal related to said deviation;
   means for storing said error signal over time periods in excess of the interval between heat pulses and yet responsive to changes in said error signal during said heat pulses;
   means responsive to said error signal signal for correcting the heat pulse energy in a manner to reduce said deviation;
   whereby initial correction of the heat pulse energy need not be redetermined for each heat pulse, the corrected value of heat at the end of each heat pulse being applied automatically to the succeeding pulse.

8. The device defined in claim 7 including gate means actuable on discontinuation of weld heat for preventing changing of said stored error signal and actuable on incidence of weld heat for allowing changing of the stored value of said error signal in response to changes in said deviation.

9. In an apparatus for regulating welding heat applied to a workpiece in discrete heat pulses by a welding machine, the combination comprising:
   means for sensing an electrical characteristic related to the weld heat;
   means generating a reference signal corresponding to the desired weld heat;
   a feedback circuit for comparing said electrical characteristic to the reference signal for producing an error signal related to the difference therebetween;
   a high gain D.C. operational amplifier and means connected to said feedback circuit for placing said error signal on the input of said operational amplifier;
   a memory gate connected to the output of said operational amplifier;
   a memory circuit coupled by said memory gate to the output of said operational amplifier circuit for remembering the output signal of said operational amplifier;
   a phase shift circuit and means connecting the output of said memory circuit thereto for changing the weld heat in a manner to minimize said error signal.

10. The device defined in claim 9 including a potentiometer connected between the output of said feedback circuit and the input of said operational amplifier and a negative rate feedback path connected between the output of said memory circuit and the input of said operational amplifier for adjusting the rapidity of response of said operational amplifier to changes in the magnitude of said error voltage whereby such response may be spread over several cycles of the alternating source powering the welding machine.

11. The device defined in claim 10 including a resting gate circuit connected across said potentiometer and means for actuating said gate to short out said potentiometer and to connect said reference signal therepast to the input of said amplifier whereby said resting gate can connect said reference signal to said amplifier during nonwelding intervals of the welding machine.

12. The device defined in claim 9 including a D.C. feedback loop connected between the output and input of said operational amplifier, said operational amplifier being of the phase-inverting type, said feedback loop including a D.C. feedback gate, the apparatus further including means actuable for completing and opening said feedback loop through said gate for removing and applying negative feedback to said amplifier.

13. The device defined in claim 9 including limit circuitry fixedly connected to the output of said memory circuit, having at least one indicator device and being actuable in response to exceeding of predetermined limits of magnitude by the signal stored in said memory circuit for energizing said indicator device.

14. The device defined in claim 10 in which said welding machine is arranged to provide a rest interval and a welding interval, spaced heat pulses being applied to the workpieces only during the weld interval, said apparatus further including a D.C. feedback gate for completing a D.C. feedback loop around said operational amplifier to provide negative feedback to the input thereof, a resting gate for connecting said reference signal to the input of the said amplifier and resting gate driver circuitry connected to said memory gate and resting gate for energizing same simultaneously during said rest interval.

15. The device defined in claim 9 including a D.C. feedback gate energizable for providing negative feedback from the output of said operational amplifier to the input thereof and gate driver circuitry connected to said memory gate and to said D.C. feedback gate and gate driver means operatively connected to said feedback gate and to said memory gate for alternatively driving said gates whereby said gate driver means is energizable during heat pulses to cause conduction of said memory gate and otherwise to cause conduction of said D.C. feedback gate.

16. The device defined in claim 15 in which said welding machine includes timing means actuable for signalling the occurrence of a heat pulse and in which said phase shift means is actuable for signalling the initiation of weld current flow point in each half cycle of the heat pulse and further including synchronous flip-flop means responsive to the two conditions signalled by the said timer means and said phase shift means for producing an output, said gate driver means being connected to the output of said flip-flop means for causing conduction of said memory gate and nonconduction of said feedback gate.

17. The device defined in claim 9 including gate driver means responsive to the beginning of the first half cycle of the heat pulse from said welding machine and to a phase shift signal from said phase shift circuit for producing an output at the beginning of weld current flow in each half cycle of each heat pulse and resting gate driver means responsive to a signal from said welding machine corresponding to the rest interval of said welding machine, for producing an output condition;

OR circuitry coupling the output conditions of said gate driver means and said resting gate driver means to said memory gate for causing conduction of said memory gate in response to either one of said output conditions whereby said memory gate conducts during heat pulses and during the rest interval but not during cool periods between heat pulses in the weld interval.

18. The device defined in claim 11 including gate driver means and resting gate driver means having output lines coupled together and to said resting gate means, said resting gate driver means being responsive to the rest interval of said welding machine for causing conduction through said resting gate and being alternatively actuable for closing the conductive path through said resting gate, said gate drive circuit being clamped by said resting gate driver means in a condition of inoperability during rest time by the connection of said resting gate driver means thereto.

19. The device defined in claim 9 including means of coupling said feedback circuit to the weld current carrying portion of said welding machine, said feedback circuit including rectifier and filter means for producing a rippling D.C. output in response to conduction of weld current and in which the polarity of the rectified and filtered signal appearing at the output of said feedback circuit is opposite to that of said feedback signal, whereby a signal equal to the difference in magnitude of said reference and feedback signals appears in the output of said feedback circuit.

20. The device defined in claim 9 in which said phase shift circuit is connected to the output of said memory circuit through a switch and means actuable for determining the power factor of the weld current and further including manually adjustable means connected between a contact of said switch and selectable alternatively of that connected to said memory circuit, said manually adjustable means being connected to a source of potential whereby upon selection by said switch, said manually adjustable means may be used to manually select the firing point of the welding machine.

References Cited
UNITED STATES PATENTS

| | | | |
|---|---|---|---|
| 2,848,595 | 8/1958 | Van Sciver | 219—108 |
| 3,094,608 | 6/1963 | Archer | 219—110 |
| 3,149,221 | 9/1964 | Watter et al. | 219—110 |

JOSEPH V. TRUHE, Primary Examiner

R. F. STAUBLY, Assistant Examiner

U.S. Cl. X.R.

328—69